United States Patent [19]

Blank et al.

[11] Patent Number: 4,521,177
[45] Date of Patent: Jun. 4, 1985

[54] MULTIPLE INJECTION MOULDING APPARATUS

[75] Inventors: Michael G. Blank, Wuppertal; Horst E. Hammerschmidt, Hattingen, both of Fed. Rep. of Germany

[73] Assignee: Maschinenfabrik Koppern FmbH & Co. KG, Hattingen, Fed. Rep. of Germany

[21] Appl. No.: 597,551

[22] Filed: Apr. 5, 1984

Related U.S. Application Data

[63] Continuation of Ser. No. 433,450, Oct. 8, 1982, abandoned.

[30] Foreign Application Priority Data

Oct. 14, 1981 [DE] Fed. Rep. of Germany ....... 3140711
Jul. 31, 1982 [DE] Fed. Rep. of Germany ....... 3238743

[51] Int. Cl.³ .......................... B29C 1/00; B29F 1/022
[52] U.S. Cl. .................................... 425/533; 249/122; 249/124; 249/135; 425/542
[58] Field of Search ................ 425/110, 117, 533, 542; 249/122, 124, 135

[56] References Cited

U.S. PATENT DOCUMENTS

| 3,694,124 | 9/1972 | Saumsiegle et al. | 425/242 |
| 3,740,180 | 6/1973 | Sidur | 425/533 |
| 3,768,944 | 10/1973 | Ninneman | 425/525 |
| 3,838,961 | 10/1974 | Yogosawa et al. | 425/533 |
| 3,850,560 | 11/1974 | Farrell | 425/168 |
| 3,850,562 | 11/1974 | Takeuchi et al. | 425/534 |
| 3,887,316 | 6/1975 | Hestave | 425/525 |
| 3,947,181 | 3/1976 | DesJonqueres | 425/533 |
| 4,147,748 | 4/1979 | Saumsiegle | 264/294 |
| 4,209,290 | 6/1980 | Rees et al. | 425/547 |

Primary Examiner—Willard E. Hoag
Attorney, Agent, or Firm—Gottlieb, Rackman & Reisman

[57] ABSTRACT

A multiple injection moulding apparatus for making parisons for blow molding bottles, the mould having a plate fixed on the nozzle side of the injection moulding machine on which outer moulds, each in a separate housing, are mounted with their faces against the plate. An independent pair of mould end plates is allotted to each outer mould with, in each case, a separate guide which extends at right angles to the direction of opening of the injection mould. In addition a common hydraulic drive to open and close the pairs of mould end plates is provided for a plurality of said pairs of mould end plates arranged adjacent each other.

9 Claims, 9 Drawing Figures

MULTIPLE INJECTION MOULDING APPARATUS

This application is a continuation of application Ser. No. 433,450, filed Oct. 8, 1982, now abandoned.

FIELD OF THE INVENTION

The invention relates to a multiple injection moulding apparatus, in particular for preforms (parisons) provided with a bottle neck socket for the manufacture of bottles by the blast (blow moulding) method, of the type including a fixed plate on the nozzle side of the injection moulding machine; a plurality of outer moulds, each of which defines a substantially cylindrical outer section of a preform; a plurality of mould elements defining the contour forming the base of a preform and on which there is formed a filling channel connected through said fixed plate; a core-carrying plate movable within the injection moulding machine on to which there are fixed a plurality of cores which engage in said respective outer moulds; pairs of mould end plates movable at right angles to the axis of said outer moulds and defining an internal contour which moulds a preform with an external form of the socket of the neck of a bottle; an intermediate plate on which said mould end plates are mounted and which is adjustable relative to said plate carrying said cores in order to withdraw said cores out of the preforms, and at least one hydraulic drive means for the pairs of said mould end plates.

DESCRIPTION OF THE PRIOR ART

In known multiple injection moulds, the outer moulds are formed in inner housings which can be mounted in bores in a common plate. The end plates of neighbouring individual moulds are thereby provided on strips which extend, in each case, over several individual moulds arranged in a row. These strips are mounted on sloping guide surfaces. In order to achieve as much economy as possible injection moulds of this type are, in general, designed for a plurality of preforms, in general sixteen or even thirty-two preforms.

A multiple injection mould is also known (DE-OS No. 21 48 616) which is designed as a combined injection mould and blast mould for a single stage injection-blast method. In this known injection mould, the outer moulds of the injection stations lie on a circle about an axis of rotation about which the two parts of the mould are able to turn relatively to one another. The mould bores are thereby each formed in inner housings which are arranged in a common plate in which alternate inner housings are arranged for the blast moulds. In order to form the outer contour of the neck of the preforms, divided end plates are provided for the moulds and are guided in intermediate plates on sloping guide surfaces and which are, in each case, able to be moved in the plane of the supporting surfaces by means of separate hydraulic drives. The end plates of the moulds are separate for each injection station as determined by the construction and function of the mould. However, the guides are all formed in the intermediate plate.

For preforms for the manufacture of containers, in particular bottles, by the blast (blow moulding) method, high demands are made for uniformity of wall thickness, freedom from ridges in the closure region of the neck of the bottle and constancy of weight. In addition moulds of this type must be designed for injection moulding with polyethylene terephthalate (PETP).

PETP is a material which crystallises at temperatures between 80° C. and 250° C. Injection must therefore be carried out at temperatures above 250° C. and, in order to ensure an amorphous structure of the preforms, they must be cooled to a temperature below 80° C. with high speed. This leads to extraordinary loading of the mould parts during operation and to different heat expansions of the individual mould plates. In order to maintain the coaxiality of all component parts these expansions must be taken into account during the fabrication. This entails great expense in the manufacture of multiple injection moulds of this type.

It is an object of the invention to design a multiple injection mould in which the thermal problems arising are taken into account in a special manner and which leads to a simplified method of manufacture.

SUMMARY OF THE INVENTION

This object is solved according to the invention by the provision in the multiple injection mould of the type set out hereinbefore of a plurality of inner housings in each of which one of said outer moulds is formed; a plurality of separate external housings of which a respective one encloses a respective inner housing, each said external housing being secured at its end adjacent said fixed plate to said fixed plate; a separate pair of said mould end plates assigned to each said outer mould; an outer frusto-conical surface formed on each pair of said mould end plates; internal frusto-conical surfaces on said outer moulds co-operable with respective said outer frusto-conical surfaces; an inner frusto-conical surface on each said mould end plate co-axial with the socket of a bottle neck to be formed in a preform and which acts in conjunction with an outer frusto-conical surface on a respective said core; a plurality of separate guides, each extending at right angles to the direction of opening of the injection mould, and in which guide each pair of said mould end plates is mounted and a common hydraulic drive for a plurality of adjacent pairs of said mould end plates to open and close the pairs of said mould end plates. Convenient embodiments of the invention are described and claimed hereinafter.

BRIEF DESCRIPTION OF THE DRAWINGS

The invention is illustrated by way of example in the accompanying drawings and is described in detail in the following with reference to the drawings, in which.

DESCRIPTION OF THE PREFERRED EMBODIMENTS

Figure 1:
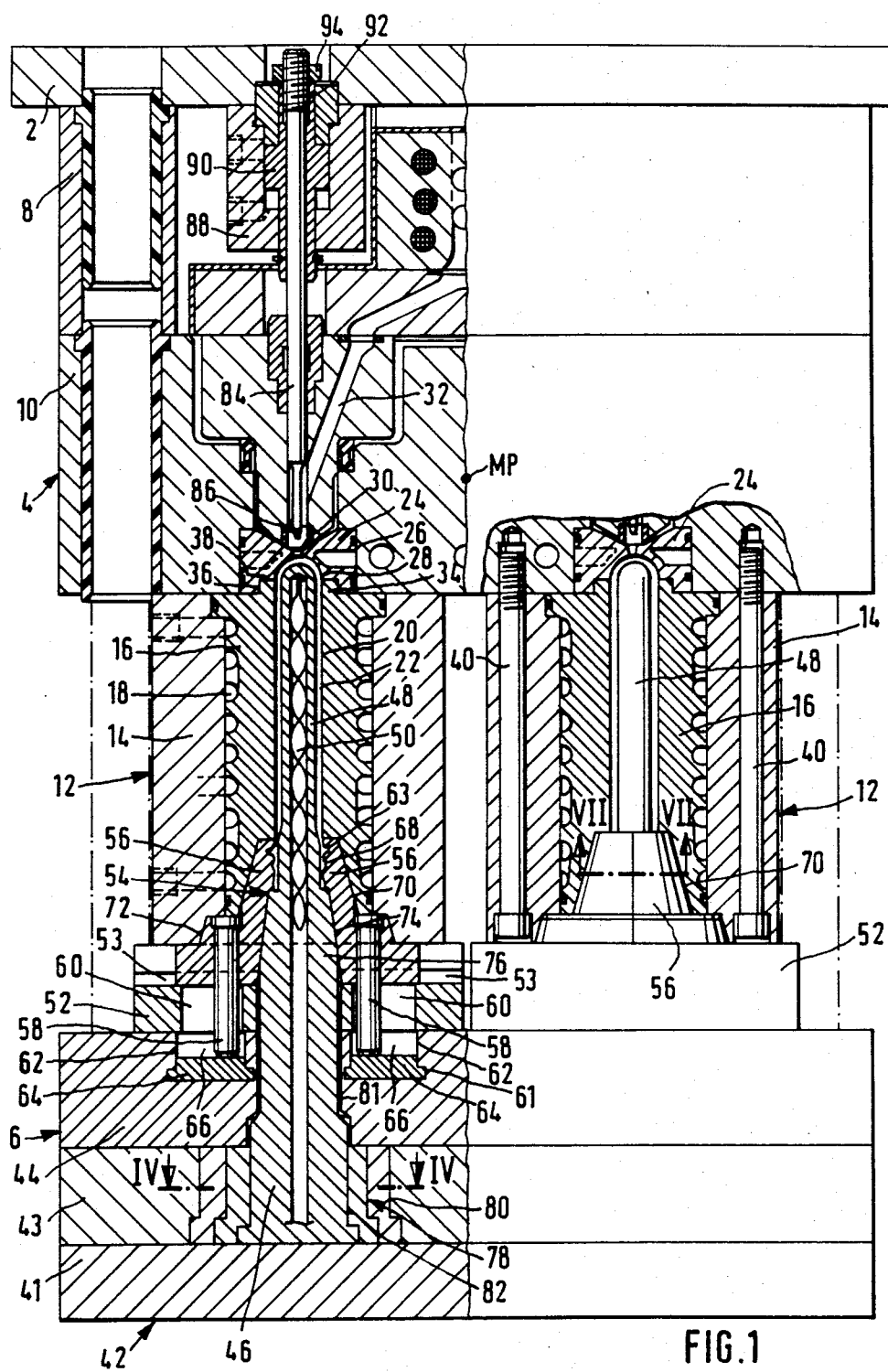
FIG. 1 shows an embodiment according to the invention of a multiple injection mould in the closed state, where the mould is illustrated in section on the left-hand side and partly cut away on the right-hand side of the vertical centre-line of the figure.

The multiple injection mould illustrated in the drawings includes a first mould half 4 fixed on the injection moulding machine by means of an attachment plate 2 and a second mould half 6 which can be moved mechanically relative to the first mould half in the direction of opening. The mould half 4 comprises two plates 8 and 10 mounted one above the other and carried by the attachment plate 2. A plurality of separate mould housings 12 are mounted on the plate 10. There may, for example, be sixteen such mould housings arranged in two rows, each of eight mould housings; but four rows, each of four mould housings, may also be provided in another convenient arrangement.

Each mould housing 12 includes, in the embodiment illustrated, an outer housing 14 in which there is arranged an inner housing 16 on the exterior of which grooves 18 are formed. When the inner housing has been inserted into the outer housing 14, the grooves 18 form cooling channels, in a known manner. The channels are provided with inlet and outlet connections. A mould bore 20 is formed in the inner housing 16. The housing 16 defines the outer contour of the hollow space 22 of a mould.

Mould elements 24, set into bores 26, are recessed into the plate 10. Each mould element 24 has at its external end a recess 28 in the form of a spherical segment which defines the external contour of the base of the hollow space 22 of the mould. In addition there is produced in the mould element 24 a filling channel 30 which is connected to a heat flow distributor system 32 of known construction, which will not be described in more detail here. At the external end of the mould element 24 there is provided, in addition, a depression 34 of a diameter larger than that of the spherical recess 28 in the form of a spherical segment and co-axial with said recess 28, in which there engages a centring support 36 which is formed on the face of the inner housing 16 and which is applied with its face 38 against the base of the recess 34 of the mould element 24. The attachment of the inner housing 16 to the plate 10 takes place through the outer housing 14 and, in particular, by means of screws 40 as is shown at the right-hand side of FIG. 1.

As can be seen, the separate mould housings, each with a mould bore, are thereby fixed to the plate 10 in such a way that they can independently follow the heat expansion of the plate 10.

The mechanically movable mould half 6 includes a base plate 42, formed as a double plate comprising separate plates 41 and 43 attached to one another and a plate 44 intermediate the plate 43 and the mould housings and adjustable in the closure direction of the mould, on which there are arranged the end plates of the moulds, to be further described hereinafter, and which define the internal contours which form the sockets of the necks of bottles to be moulded.

The foot 46 of the core 48 in the form of a pin which defines the internal contour of the hollow space 22 of the mould is clamped in the plate 43 which carries the core. The core is provided, in the usual way, with an axial guide 50 for cooling medium, the connection of which is designed in the usual manner and is not illustrated in the drawing.

Figure 2:
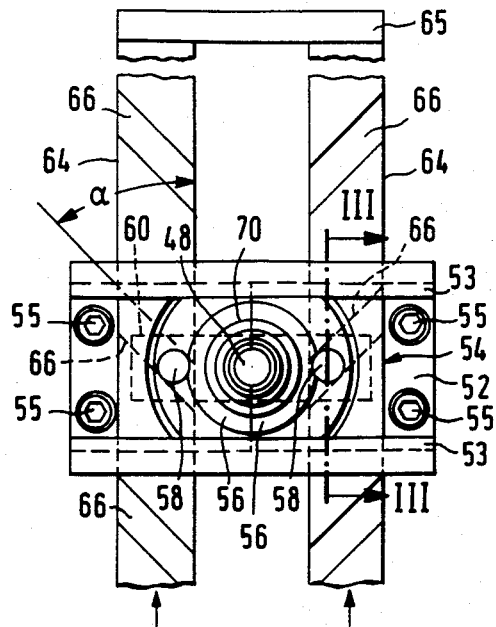
FIG. 2 shows a plan view of the intermediate plate which carries the end plates of the injection mould according to FIG. 1 the end plates being shown in closed position.
Figure 2A:
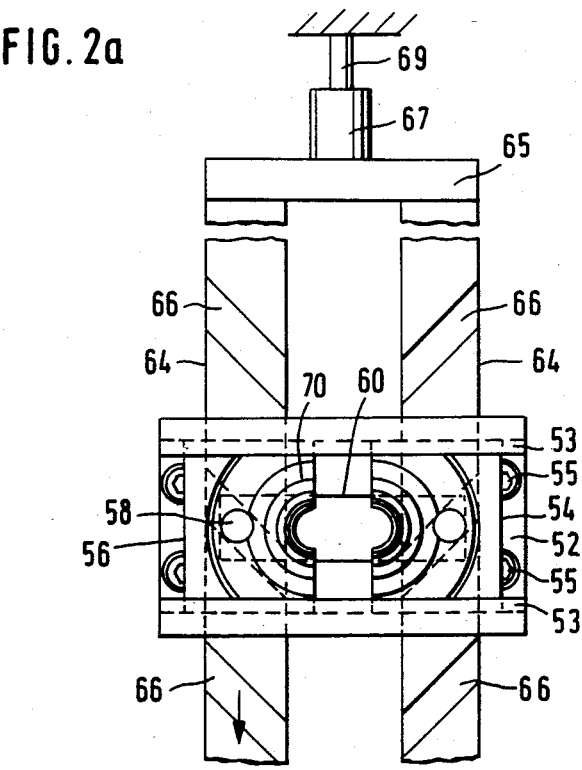
FIG. 2a is a plan view of the intermediate plate similar to FIG. 2, showing the end plates in open position.

Guide plates 52 are attached to the upper face of the intermediate plate 44. A pair of mould end plates 54 are mounted on each guide plate 52 to be movable transversely in guide grooves 53. The individual mould end plates 56 are provided with thrust pins 58 which pass through openings 60 in the guide plate 52 with their ends extending beyond the lower face of the guide plate 52. Within the intermediate plate 44 there are arranged, at a distance from one another, undercut grooves 62 running at right angles to the direction of displacement of the end plates 56 of the moulds, in which adjustment bars 64 having lateral projections 61 are mounted to be movable transversely to the guide 53 in the guide plates 52. These adjustment bars 64 are connected together by means of a yoke 65 at one end of the mould. Cylinders 67 of hydraulic drives are attached to the yokes 65. Piston rods 69 of the hydraulic drives are firmly fixed to the plate 44. Each of the adjustment bars 64 has in the upper face thereof a groove 66 extending at an acute angle α to the longitudinal direction of the bar 64 in which the end of one of the thrust pins 58 engages. The grooves 66 in the two adjustment bars 64 are inclined in opposite directions as shown at the right-hand side of FIG. 2.

When the two adjustment bars 64 are displaced longitudinally, the thrust pins 58 which engage in the grooves 66 are moved at right angles by means of said grooves 66 so that the end plates 56 of the moulds are moved away from or towards one another.

The two end plates 56 of the mould carry at their upper ends an inner contour-defining member 68 which corresponds to the desired contour of the socket of the neck of the bottle to be moulded. This contour may, for example, be a threaded contour when a screw closure is provided for the stopper of the bottle. It may alternatively be a simple beaded contour when a crown cork or the like is provided as the closure of the bottle. In addition, the internal contour defines a neck ring 63 in each of the preforms when applied in the manufacture of bottles by the blast method, said neck ring being necessary for the clamping of the preforms in the blast machine.

The two end plates 56 of the mould carry a centering cone 70 on their outer side, said cone engaging in a centering bore in the free face of the inner housing 16. Alternatively, it is possible for a centering cone 72 to be provided which engages in a corresponding conical bore in the outer housing 14 which extends from the face of the housing. The centering cone ensures that the inner contour of the core pin 48 of the end plates of the moulds is exactly central to the outer contour of the mould bore 22.

The end plates 56 of each pair 54 of mould end plates are, in addition, provided with a conical centering bore 74 extending outwards from its under side which acts in conjunction with a centering cone 76 formed at the lower end of the core 48 of the mould. The mould core 48 is centered in the mould bore 20 by means of the pair of end plates by the centering cone 76.

In order to ensure that the core pin 48 retains its centered position in the mould bore 20 during heat expansion within the plate 10, the attachment of the core foot 46 in the plate 43 may take place with lateral play so that, on closing the mould, the foot is movable within the bore in plate 43 in parallel to the axis in its position centered with respect to the mould bore by means of the centering device 74, 76. The bore 81 in the plate is designed with a diameter suitable to make this displacement possible.

Figure 4:
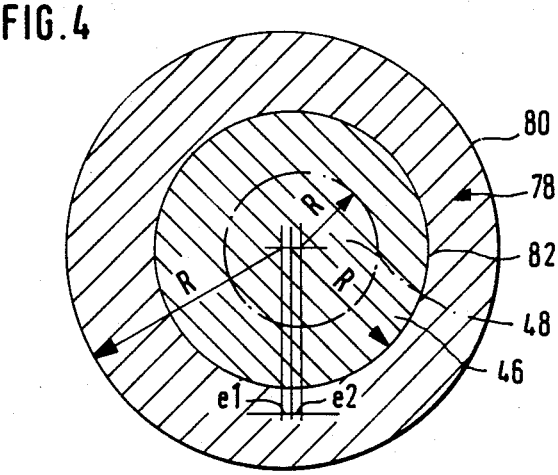
FIG. 4 shows a section along the line IV—IV of FIG. 1.

Another possibility for the alignment of the foot of the core pin 48, illustrated in FIG. 4, is that the foot 46 of the core pin 48 is designed with a predetermined eccentricity relative to the axis of the core pin 48 and the foot 46 is clamped in a sleeve 78 which can be rotated about its external circumference in a bore 80 which, in the cold mould, is preferably co-axial with the bore 20, the bore having an eccentricity e2 relative to the external cylinder of the sleeve 78 and equal to the eccentricity e1 of the core foot 46 relative to the core pin 48. In this manner a continuous movement of the core pin 48 parallel to its axis is possible within a circular surface, the radius of which is equal to the sum of the eccentricities e1 and e2. Thus the core can be adjusted exactly centrally within the mould bore 20 at the working temperature even with differing expansions of the plate 42 and the plate 10. The same effect can be produced when, as illustrated in FIG. 1, the core foot 46 is situated centrally with respect to the core pin 48 and the clamping 78 takes place within two adjustment sleeves fitting into one another, the annular contact surfaces 82 of which, in each case, exhibit the required eccentricities e1 and e2. Rotary drives operated from the exterior may be provided for the sleeves.

Sufficient play should preferably be provided for the end plates 56 of the mould within the guide plates 52 so that they are enabled to follow relative movements in the transverse direction between the mould housings which are attached to the plate 10 and to the intermediate plate 44 which said movements result from differences in heat expansion. Additionally or alternatively an overmeasure may be provided for the throughpass bores for screws 55 in the guide plates 52. A coarse setting may be undertaken during assembly in that the screws 55 are at first only tightened to such an extent that the guide plates 52 can be moved during closing of the mould by means of the end plates 56 of the mould to their positions arising at the operating temperature. When these positions have been reached, the guide plates 52 are fixed by tightening the screws 55. Variations in the operating temperature can be compensated for by means of the play which may be provided in advance by suitable tolerances with positive overmeasure. It is possible in this manner for the individual end plate pairs of each of the moulds 54 to be adjusted independently, an advantage in the case of multiple moulds, for example moulds for the manufacture of sixteen or even thirty-two preforms.

Movements of the core pins 48 parallel to the axis in the hollow space of the mould are brought about, on the one hand, by differing heat expansions of the plates 42 and, on the other hand, by the plate 10 heated by the heat flow system. They may also be prevented, in part or completely, or reduced, when a heating device is provided for the plate 42, whose output of heat in the plate 42 may be regulated in dependence on the rated temperature at a representative temperature measurement point MP in the plate 10.

As can be seen from the foregoing, all shape-determining elements can be adjusted coaxially relative to the centering of the plate 10 by means of the arrangement described in such a way that heat expansions within the plate have no effect on the individual moulds whatever their magnitude or direction. It is possible thereby, without taking into account the heat expansion, to fix the individual mould housings, for example, in dependence on the available cross-section in the injection moulding machine. A particular advantage again consists in that a plurality of work pieces of similar type and small dimensions can be fabricated by distribution within the individual mould housings. This leads to an important simplification in the fabrication. Owing to the distribution of the end plates of the moulds in individual pairs of end plates for each separate mould and the centering of these end plates of the moulds, as described hereinbefore, by means of the individual mould housings, it is easily possible to manufacture the neck contours of the bottles substantially without the formation of ridges and without back filling.

In the plates 8 and 10 closure needles 84 are mounted coaxially with the axes of the hollow spaces of the moulds and, in one end position, engage with their lower ends 86 closing the filling channels 30. These axially-adjustable valve closure needles are provided with a hydraulic drive 88. The drive is produced by means of pistons 90, capable of being acted on from both sides, into which the closure needle 84 is screwed by means of a thread 92. The setting to which the needle 84 has been adjusted is fixed by means of an adjustable nut 94. The drives 88 are conveniently controllable by means of a time control. It is possible by means of such a time control of the drive for the closure needles 84 to adjust exactly the filling of each individual mould in a plurality of mould hollow spaces and in this way to achieve high accuracy in the reproduction of the weight of the injected preforms. By time control of the closure point of the valve closure needles 84, where necessary in conjunction with a possibility of adjusting the inflow cross-section, it is possible to compensate for differences in the rate of flow of the synthetic or other moulding material to be injected, these being unavoidable even in a very well-compensated heat flow channel system and the differences in weight of the preforms associated therewith.

The invention is described in the foregoing with reference to the manufacture of preforms provided with a bottle neck socket for the manufacture of flasks by the blast method. It is, however, also applicable to the manufacture of other bodies, in particular those in which the ratio of the length extending in the direction of movement of the tool to the dimension at right angles to it is large.

Figure 5:
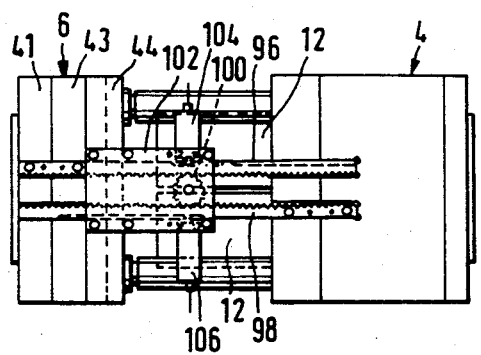
FIG. 5 shows a side view of an embodiment according to the invention of an injection mould in the closed state.
Figure 6:
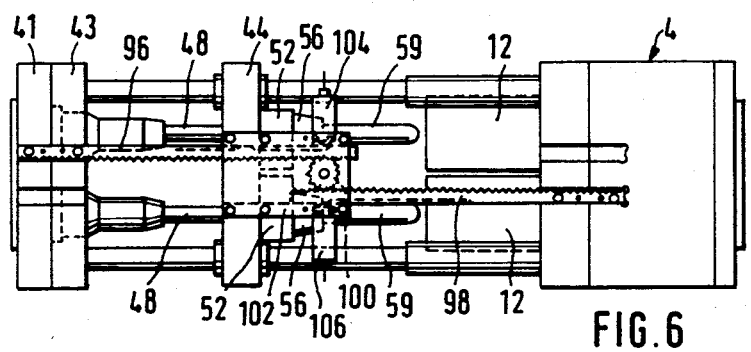
FIG. 6 shows the injection mould shown in FIG. 5, seen from the side, in the open state.

In the injection moulds illustrated in side view in FIGS. 5 and 6, there are fixed to the mechanically-fixed base plate 4, on the one hand, the mechanically movable base plate 6, as well as to the plates 41 and 43, and, on the other hand, toothed racks 96 and 98, situated parallel to one another with their teeth directed towards one another. Between the two toothed racks there is arranged a pinion 100 engaging with both racks and mounted on a plate 102 which is attached to the plate 44 carrying the end plates 56 of the moulds. The movement of the plate 44 is controlled by the toothed racks and the pinion in such a way that during opening and closing of the mould it moves the plates 41 and 43 with half the velocity of the plate 44. In this way there is ensured a simultaneous withdrawal of the preforms 59 from the hollow space 20 of the moulds and of the pins 48 out of the preforms during opening of the mould. In addition two end switches 104 and 106 are attached to the plate 102. These end switches operate in conjunction with stops arranged on the rear side of the toothed racks 96 and 98.

By means of the end switches, the opening movement of the pairs of end plates of the moulds 54 is controlled in two stages and, in particular, in such a way that at the beginning of the opening movement of the injection mould the pair of end plates 54 of the mould are first partly opened and, in particular, to such an extent that the thread on the preform is released from the mould. This opening stroke thus corresponds, for each mould end plate, to about the radial height of the thread. This movement of the end plates of the mould may be initiated as soon as the centring cone 70 formed on the pairs of mould end plates 54 is able to perform a suitable radial movement within the centering bore 68 in the interior of the mould housing 16. The first opening movement of the end plates of the moulds should be terminated while the core pin 48 is still situated within a cylindrical or slightly conical section of the preform and the preform is able to perform no radial movement or only a very slight radial movement relative to the core pin 48. Such a cylindrical or very largely cylindrical section is normally provided in the region of the contour of the neck section of the preform formed within the end plates of the mould.

The first opening movement may be limited by releasable stops; but it may also be predetermined for the end plates of the mould by a time control of the hydraulic drive 67.

The neck contour of the preform formed within the end plates of the mould includes, in addition to the thread contour, a contour for a neck ring 63 used for clamping the preform in a blast machine in which flasks are later blown from the preforms. This neck ring 63 has a larger external diameter than the thread. The end plates of the mould therefore remain in partial contact with the neck ring 63 even after the first opening movement as can be seen in FIG. 7.

Figure 7:
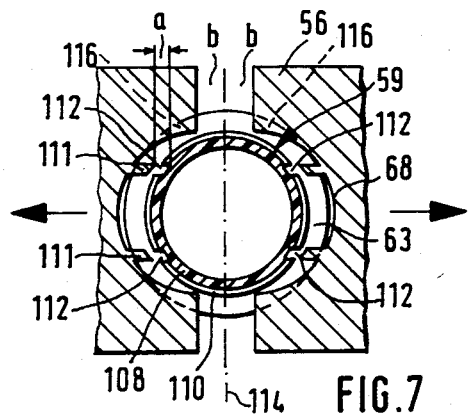
FIG. 7 shows the partial release of the thread on the neck of a bottle provided with evacuation slots, in section along the line VII—VII of FIG. 1.

FIG. 7 shows a plan view of the socket of the neck of the bottle of a preform. The neck ring 63 and the threaded socket 108 with thread 110 may be seen. The drawing also illustrates the plane of separation 114 in which the two end plates of the mould are in contact in their closure position. Here, four evacuation slots 112 are provided in the thread 110 and extend, in each case, parallel to the axis of the thread and which cut the thread in four places in each case up to the base of the thread. For reasons of tool technology, the wedges 111 which form these slots and which are fixed in the end plates of the mould, are provided with parallel side faces. In this case the side faces are situated in the direction of movement of the end plates of the mould. Release from the mould is thus particularly critical at these positions. In order to ensure a complete release of the wedges 111 which form the grooves 112, the end plates of the mould must move through a minimum stroke of height a which corresponds to the depth of the evacuation slot 112 measured at right angles to the plane of separation 114 and which is thus somewhat larger than the radial height of the thread.

If the preform contains no cylindrical section in the region of the socket of the neck of the bottle but only a slightly conical section it is necessary to assign a somewhat longer path to the first opening movement of the end plates of the mould in order to compensate for any possible radial pick-up of the preforms by one of the end plates of the mould.

After the first opening movement has been completed, the preform still remains clamped by the end plates of the mould over four "comma-shaped" surfaces 116 on the upper and lower sides of the neck ring. Contact with these surfaces is sufficient to accept the forces of tension and pressure which must be exerted on the preforms during continued release of the preforms from the mould. As can be seen from the foregoing the actual opening stroke of the end plates of the mould in the first opening movement may lie between the magnitudes a and b.

At the conclusion of, or in the concluding stages of the opening movement of the injection mould, the end switch 106 is activated by means of which the end plates 56 of the mould are fully opened so that the preform can fall out.

The two end switches 104 and 106 may be arranged to be movable on the carrying plate 102 and thus to act in conjunction with fixed switch cams on the toothed racks. It is, however, also possible to provide movable switch cams on the toothed racks and to arrange for the switches themselves to be fixed or for fixed switches to act in conjunction with fixed switch cams.

Figure 3:
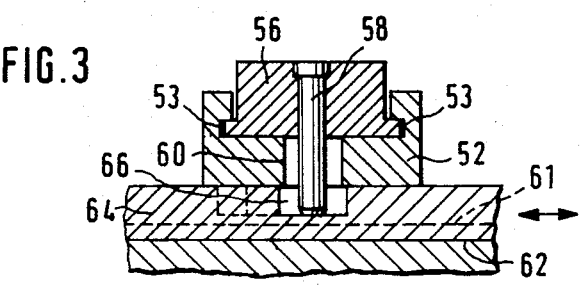
FIG. 3 shows a section along the line III—III in FIG. 2.
Figure 8:
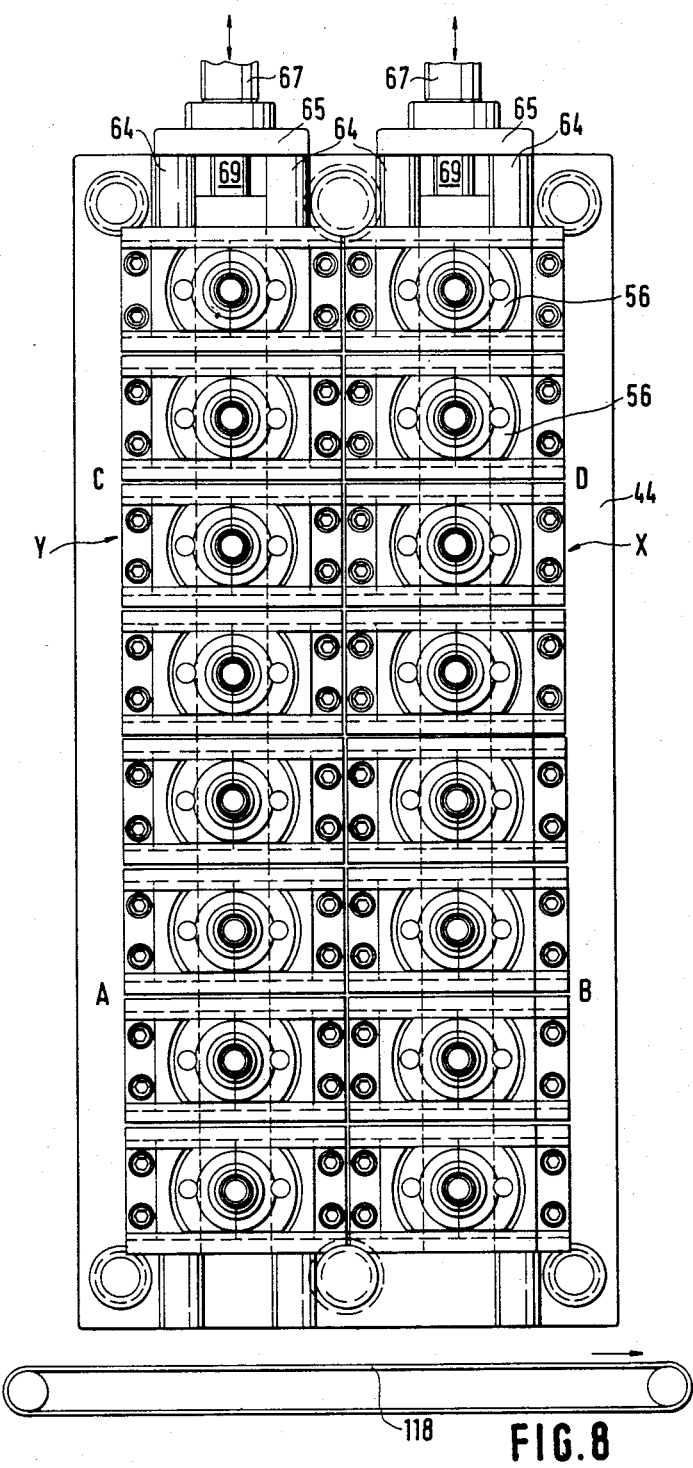
FIG. 8 shows a plan view of the intermediate plate which carries the end plates of the moulds of a sixteen-fold tool.

FIG. 8 illustrated the intermediate plate 44 with the end plates 56 of the moulds for a sixteen-fold injection mould. The injection mould is here so arranged in the machine that each of eight-mould housings are situated in a row perpendicularly one above the other. The eight pairs of end plates 54 of the moulds of each of the two rows are, in each case, opened and closed by means of activating rods 64, as has been described with reference to FIGS. 1 to 3. The activating rods 64 are, in each case, operated by hydraulic cylinders 67.

In order to achieve a reliable separation of the individual preforms during ejection from the injection mould, a so-called separating belt 118 may be arranged below the injection moulds as is shown in FIG. 8 as a section through the belt.

The velocity of the separating belt should be adjusted in such a way that the preforms falling vertically strike the separating belt one after the other. With simultaneous opening of all the pairs of mould end plates this is only possible with very high belt speeds, when it is also impossible to prevent some preforms from falling one on top of the other.

In order to achieve as short a working cycle as possible, efforts have to be made to ensure that the preforms are ejected from the mould as early as possible. Fundamentally, this may take place at temperatures at which the preforms are still soft and rubbery. If two preforms should strike one another, welding may occur and this would make the preforms unusable.

In order to prevent this there is provided according to the invention, a programmed control by means of which the drive 67 for final opening of the end plates of the moulds to eject the preforms can be controlled in time in such a way that a greater certainty of separation is possible with a lower velocity of the separating belt 118. This may, for example, take place in that for an injection mould with an attangement of individual moulds in two parallel rows one above the other, that is as illustrated in FIG. 8, with a separating belt 118 moving from left to right, the moulds of the right hand row X of pairs 54 of mould end plates are opened first and then after a time delay the moulds of the left hand row Y of pairs of mould end plates are opened.

It is convenient to undertake a still further subdivision of the drive for the pairs 54 of mould end plates.

For example, in particular, into four groups denoted at the edge by A to D. Each group contains four pairs of mould end plates. Separate activating pairs of rods are here provided for the pairs of mould end plates of each group, where there is then also provided a separate hydraulic drive for each group, shown for the groups A and B in dotted lines in FIG. 8. In such a case the pairs of mould end plates, again assuming that the separating belt 118 in FIG. 8 moves from left to right, are opened in the series B-A-D-C. Such a time control of the hydraulic drive 67 of the four groups A to D of pairs of mould end plates, with time delay, makes possible a reliable separation at low speeds of the separating belt without a significant lengthening of the cycle time.

Lower speeds of the separating belt also make possible shorter lengths of cooling tunnel if the preforms are, as is usual, transported through the cooling tunnel on the separating belt.

What we claim as our invention and desire to secure by Letters Patent of the United States is:

1. A multiple injection mould for preforms provided with a bottle neck socket, said preforms having application for the manufacture of bottles by a blast method, the mould including a fixed plate on the nozzle side of the injection moulding machine; a plurality of outer moulds, each of which defines a substantially cylindrical outer section of a preform; a plurality of mould elements recessed into the fixed plate, said mould elements defining the mould contour which forms the base of the preform, each of said mould elements also including a filling channel; a core-carrying plate movable within the injection moulding machine on to which there are fixed a plurality of cores which respectively engage said outer moulds; pairs of mould end plates movable at right angles to the axis of said outer moulds, said mould end plates having an internal contour dimensioned for moulding the socket of the bottle neck; an intermediate plate on which said mould end plates are mounted and which is adjustable relative to said core carrying plate in order to withdraw said cores out of the preforms; a plurality of inner housings in each of which one of said outer moulds is formed; a plurality of separate external housings which respectively enclose said inner housings, each of said external housings being secured to said fixed plate; a separate pair of said mould end plates being assigned to each of said outer moulds; each pair of mould end plates having an outer frusto-conical surface, said outer moulds having internal frusto-conical surfaces which respectively cooperate with said outer frusto-conical end plate surfaces, each of said mould end plates also including an inner frusto-conical surface which is coaxial with the socket of the bottle neck formed by the preform, said mould end plates acting, respectively, in conjunction with outer frusto-conical surfaces on said cores; a plurality of separate guides, each extending at right angles to the direction in which the injection mould opens, each pair of said mould end plates being mounted in said guides; and a common hydraulic drive for a plurality of adjacent pairs of said mould end plates to open and close the pairs of said mould end plates.

2. A multiple injection mould according to claim 1, in which said guides are mounted on said intermediate plate and are individually adjustable in the plane of said intermediate plate.

3. A multiple injection mould according to claim 1, in which each core has a cylindrical foot section of which the axis is situated eccentrically with respect to the axis of a moulding section of said core and in which there are a plurality of sleeves, each having an eccentric bore in which each respective core is rotatable, said sleeves being rotatable in said core carrying plate.

4. A multiple injection mould according to claim 1, in which each core is provided with a cylindrical foot section coaxial with a moulding section of said core and in which there are, for each core, two rotatable sleeves placed one within the other, the bores of which are, in each case, eccentric to said core and to each other, said rotatable sleeves carrying said core and clamping said foot section of said core in said core carrying plate.

5. A multiple injection mould according to claim 1, further comprising pairs of operating bars mounted in said intermediate plate at right angles to the direction of movement of said mould end plates, and drive means for moving said operating bars, said operating bars having guide grooves therein extending at an acute angle to the direction of motion, said mould end plates including thrust pins which engage said grooves.

6. A multiple injection mould according to claim 1, in which said mould end plates also define on the neck of the preform a radially-projecting stopper-engaging contour and a neck ring having a diameter greater than that of the stopper-engaging contour and have centering frusto-conical surfaces thereon co-operable with frusto-conical surfaces in said outer mould and said multiple injection mould also includes driving means by which said intermediate plate is adjustable relative to said core-carrying plate during the opening movement of the latter; control means by which, during the opening movement of the injection mould after release of said centering frusto-conical surfaces formed on the mould end plates from said inner frusto-conical surfaces formed in said outer mould, the pairs of mould end plates are constrained to move through a first opening movement over a path which is greater than the radial height of the stopper-engaging contour but smaller than the radial height of said neck ring, and additional control means by which said pairs of mould end plates are constrained to perform the residual opening movement after the preforms have been released from said cores.

7. A multiple injection mould according to claim 6, further including toothed racks positioned parallel to one another and at a distance from each other with their teeth directed towards one another and connected to said fixed plate and said core-carrying plate, respectively; cams on said toothed racks; pinions arranged on said intermediate plate which carries said pairs of mould end plates, said pinions engaging with the teeth of said two racks, thereby to move said intermediate plate during opening with half the velocity of said core-carrying plate, and, as control means fixed to said intermediate plate which carries said pairs of mould end plates, switches which are operable by said cams on said toothed racks.

8. A multiple injection mould according to claim 6, including separate driving means, in each case, for separate groups (A,B,C,D,) of pairs of said mould end plates and control means by which the drives for said separate groups are each operated one after the other in a time sequence during the residual opening movement.

9. A multiple injection mould according to claim 8, including a programmed control means by which the drive for the separate groups of pairs of said mould end plates are operable.

* * * * *